US006236548B1

(12) United States Patent
Marmonier

(10) Patent No.: US 6,236,548 B1
(45) Date of Patent: May 22, 2001

(54) METHOD OF DISCRIMINATING BETWEEN AN INTERNAL ARC AND A CIRCUIT-BREAKING ARC IN A MEDIUM OR HIGH VOLTAGE CIRCUIT BREAKER

(75) Inventor: Jean Marmonier, Aix les Bains (FR)

(73) Assignee: Alstom France S.A., Paris (FR)

( * ) Notice: Subject to any disclaimer, the term of this patent is extended or adjusted under 35 U.S.C. 154(b) by 0 days.

(21) Appl. No.: 09/395,177

(22) Filed: Sep. 14, 1999

(30) Foreign Application Priority Data

Sep. 15, 1998 (FR) .................................................. 98 11477

(51) Int. Cl.$^{7}$ ........................................................ H02H 3/18

(52) U.S. Cl. ................................ 361/78; 361/2; 361/102; 361/42

(58) Field of Search ................................ 361/78, 2, 102, 361/115, 619, 42; 324/424; 218/1, 90, 100, 155

(56) References Cited

U.S. PATENT DOCUMENTS

| | | | | |
|---|---|---|---|---|
| 5,502,435 | * | 3/1996 | Ralston | 340/632 |
| 5,910,872 | * | 6/1999 | Marmonier et al. | 361/2 |
| 5,946,171 | * | 8/1999 | Magnier | 361/37 |

FOREIGN PATENT DOCUMENTS

| | | |
|---|---|---|
| 27 27 378 A1 | 1/1979 | (DE) . |
| 31 31 417 A1 | 2/1983 | (DE) . |
| 0 488 719 A2 | 6/1992 | (EP) . |
| 2 205 051 | 11/1982 | (FR) . |
| 2 731 520 A1 | 9/1996 | (FR) . |

* cited by examiner

*Primary Examiner*—Michael J. Sherry
(74) *Attorney, Agent, or Firm*—Sughrue, Mion, Zinn, Macpeak & Seas, PLLC

(57) ABSTRACT

The method relates to discriminating between an internal arc and a circuit-breaking arc established in the enclosure of a circuit breaker in a bay of a medium or high voltage metal-clad substation. The appearance of an internal arc is detected by a protection system which responds by transmitting a disengagement order to the circuit breaker, thereby causing a circuit-breaking arc to appear. The pressure of the dielectric gas inside the enclosure of the circuit breaker, is continuously measured and recorded so that after the instant at which the disengagement order is transmitted, it is possible to recover a first pressure value measured before the instant. The first pressure value is then compared with a second pressure value measured after the said instant in order to identify whether the internal arc was struck in the circuit breaker enclosure.

4 Claims, 2 Drawing Sheets

METHOD OF DISCRIMINATING BETWEEN AN INTERNAL ARC AND A CIRCUIT-BREAKING ARC IN A MEDIUM OR HIGH VOLTAGE CIRCUIT BREAKER

The invention relates to a method of discriminating between an internal arc and a circuit-breaking arc, generally of greater amplitude than the circuit-breaking arc, which can become established in the enclosure of a circuit breaker in a bay of a medium or high voltage metal-clad substation, and to do so by measuring the pressure of the dielectric gas inside the enclosure of the circuit breaker, in which the appearance of an internal arc is detected by a protection system which responds thereto by transmitting a disengagement order to the circuit breaker to cause its contacts to separate, the separation causing a circuit-breaking arc to appear.

BACKGROUND OF THE INVENTION

Such a metal-clad substation is constituted by a plurality of bays which are connected in parallel by a set of feeder busbars, each including in series with the circuit breaker a busbar disconnector (or selector switch disconnector) and an outgoing feeder. Each piece of gear in a bay is enclosed in a gastight enclosure filled with a dielectric gas under pressure for the purpose of maintaining a potential difference with a conductor that passes along the enclosure. A bay is thus constituted by a plurality of compartments constituted by the enclosures of various different pieces of electrical gear.

An electric arc which occurs between the enclosure and the conductor of a compartment of the bay is referred to as an internal arc. In conventional manner, a substation protection system is provided for detecting such a fault by measuring the current passing through the substation. However, the protection system does not make it possible to locate the internal arc, so it is not possible to identify the bay of the substation or the compartment within said bay in which the internal arc has occurred.

The compartments of each bay are provided with respective pressure sensors designed to measure the pressure of the dielectric gas to be found inside the various enclosures. If an internal arc occurs in a compartment, then the pressure detector detects an increase in pressure, thereby enabling the compartment to be identified.

Identifying the faulty compartment by an increase in pressure presents no difficulty with a disconnector or with an outgoing feeder from a bay.

In contrast, a problem of discrimination arises with a circuit breaker. When the protection system detects a current fault in the electrical substation, it issues a disengagement order to the circuit breakers which then open on receiving the order. On opening, each circuit breaker strikes a respective short circuit arc known as a circuit-breaking arc, thereby increasing the pressure of its dielectric gas.

To determine whether an internal arc has occurred in a particular circuit breaker of one of the bays of a substation, it is essential to be able to identify a circuit-breaking arc which inevitably follows the disengagement order issued by the protection system.

An apparently-satisfactory solution would base identification on the amplitude of the increases in pressure due to an internal arc as compared with those due to a circuit-breaking arc. Nevertheless, that solution is not applicable under all circumstances, in particular in the event of internal arcs that are small, since the increase in pressure that they cause is of the same order of magnitude as the increase in pressure caused by breaking a high short-circuit current.

OBJECTS AND SUMMARY OF THE INVENTION

The object of the invention is to discriminate between an internal arc and a circuit-breaking arc in a circuit breaker forming part of an electrical substation, by using a method which is applicable without restriction to internal arcs even when small, which method is simple to implement, and can be installed on existing substations for little investment.

The idea on which the invention is based is to take consideration of the length of time that elapses between the disengagement order being issued by the protection system and the instant at which the circuit-breaking arc appears when a circuit breaker opens.

More particularly, the invention provides a method of discriminating between an internal arc and a circuit-breaking arc established inside the enclosure of a circuit breaker in a bay of a medium or high voltage metal-clad substation, by means of measurements of the pressure of the dielectric gas inside the enclosure of the circuit breaker, in which the appearance of an internal arc is detected by a protection system which responds by transmitting a disengagement order to the circuit breaker to cause its contacts to separate, the separation causing a circuit-breaking arc to appear, the method comprising the following steps:

- continuously measuring the pressure of the dielectric gas inside the enclosure of the circuit breaker;
- recording said pressure measurements so that after the instant at which the disengagement order is transmitted, a first pressure value measured before the instant can be recovered; and
- comparing the first pressure value with a second pressure value measured after the instant to identify that an internal arc is established in the circuit breaker enclosure if the second value is greater than the first value, or that the internal arc is not established in the circuit breaker enclosure if both pressure values are equal.

In a particular implementation of the method of the invention, the second pressure value corresponds to a pressure measured after the disengagement order so as to take account of the mechanical response time of the circuit breaker during which a moving one of its contacts is moved relative to its other contact which is fixed, but without actually reaching the separation point. The circuit-breaking arc is therefore still not struck, such that its contribution to the increase of pressure inside the enclosure is still zero.

According to another particular implementation of the method of the invention, the first pressure value corresponds to a pressure measured prior to the disengagement order so as to take account of an electronic response time of the protection system on the appearance of an internal arc. Since the internal arc had not yet occurred, the pressure stored in the memory represents the reference pressure of the circuit breaker.

BRIEF DESCRIPTION OF THE DRAWINGS

Other characteristics and advantages of the invention will appear on reading the following description of an implementation of the method as illustrated by the drawings.

MORE DETAILED DESCRIPTION

Figure 1:
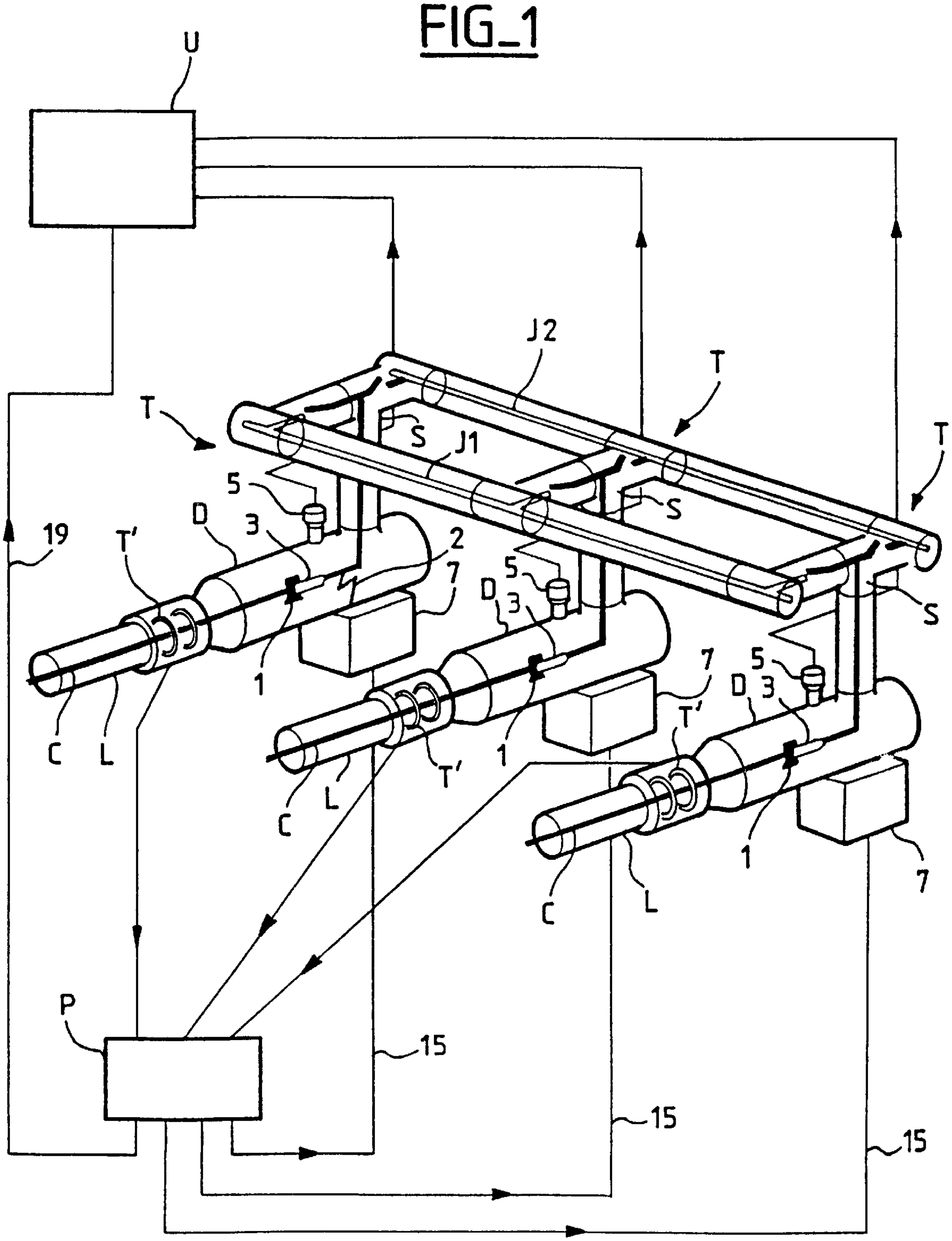
FIG. 1 is a diagram of an electricity substation which has three bays interconnected by two sets of busbars.

As shown in FIG. 1, the method of the invention is implemented in a medium or low voltage metal-clad electricity substation having three bays T which are of the single phase type in this case, that are interconnected by two sets of busbars J1 and J2, with each bay being constituted by a circuit breaker D, a selector switch disconnector S connected to the set of busbars, and by an outgoing feeder L. These various items of gear constitute a corresponding number of different compartments that are leakproof relative to one another. Each of these compartments comprises a metal enclosure filled with a dielectric gas under pressure, for example sulfur hexafluoride $SF_6$, for the purpose of maintaining a potential difference relative to a conductor C located inside the enclosure.

Each circuit breaker has two contacts 1 and 3 disposed inside the enclosure having the conductor C passing therethrough. The enclosure of the circuit breaker is thus filled with a dielectric gas under pressure and a sensor 5 is provided on the enclosure to measure the pressure inside the enclosure. The pressure value measured by a sensor 5 associated with a circuit breaker is delivered to a monitoring and control unit U which comprises a unit for acquiring and processing the pressure signal for the purpose of storing pressure continuously.

The substation also has a protection system P suitable for responding to three current transformers T' each disposed at the inlet of one of the bays within the outgoing feeder compartment L to detect the appearance of an internal arc 2 between the enclosure and the conductor C in any of the compartments of the substation. On making such a detection, it issues a disengagement order 15 to the circuit breakers D which open on receiving said order. The disengagement order is transmitted via a unit 7 for controlling the contacts 1 and 3 of each circuit breaker. Simultaneously, the protection system P issues a signal 19 to the acquisition and processing unit U in order to recover pressure values recorded for each of the circuit breakers prior to the disengagement order being issued.

As mentioned above, in order to locate the internal arc 2 within one of the three circuit breakers D by measuring an increase in pressure, it is essential to distinguish the internal arc from the circuit-breaking arc which will inevitably follow the disengagement order issued by the protection system.

According to the invention, discrimination relies on comparing a pressure determined after the disengagement order has been issued with a pressure that was determined before said order was issued, and which has been stored. An internal arc is identified in the circuit breaker by the later pressure being greater than the stored pressure, while a circuit-breaking arc is identified by the two pressures being equal.

In the example of FIG. 1, the two pressures are compared by the acquisition and processing unit of the monitoring and control unit U, and this provides "internal arc" information or "circuit-breaking arc" information.

In a first particular implementation of the invention, the instant at which pressure is measured subsequent to the disengagement order being issued is set by means of a pressure curve that is recorded during the opening of the circuit breaker.

Figure 2:
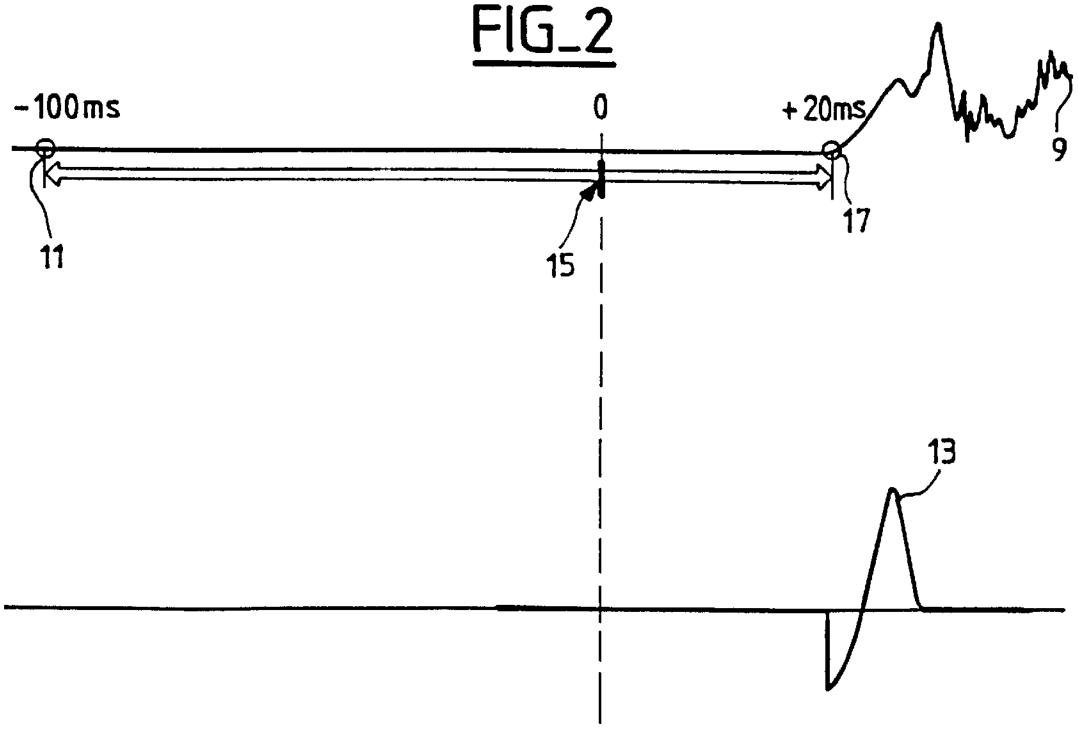
FIG. 2 is a timing diagram showing the increase in pressure in the event of a circuit-breaking arc in one of the circuit breakers of the substation shown in FIG. 1, as recorded during a test in the absence of an internal arc.
Figure 3:
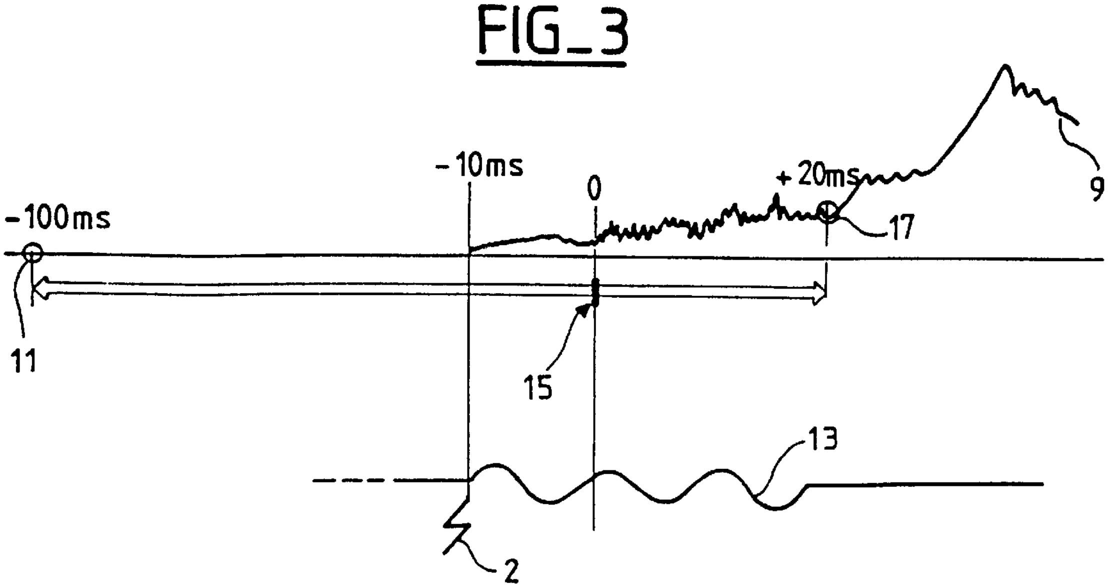
FIG. 3 is a timing diagram showing the increase in pressure in the event of an internal arc existing in the circuit breaker of the substation shown in FIG. 1, as recorded during a test in the presence of an internal arc.

FIGS. 2 and 3 are timing diagrams relating to the opening of a circuit breaker D as recorded during a test break of a short-circuit current, and as recorded during an internal arc test. During the test, a disengagement order 15 was issued to the monitoring and control unit 7 for controlling the contacts of the circuit breaker in such a manner as to simulate the protection system P. It should be observed that this system does not form part of the circuit-breaking test configuration, but is present only in configurations relating to real operation of the substation. The break test was performed in the absence of an internal arc as shown in FIG. 2, and then in the presence of an internal arc 2 that had been artificially struck inside the circuit breaker, as shown in FIG. 3.

Pressure variation within the circuit breaker is shown by a pressure curve 9. Simultaneously, variation in the current passing through the circuit breaker was recorded as shown by curve 13. It can be seen that relative to the disengagement order 15, pressure increased only from an instant 17 corresponding to a sudden change in current and which can be interpreted as the circuit-breaking arc forming when the contacts located inside the circuit breaker separate. The order of magnitude of the duration of the circuit-breaking arc is about 10 ms, which explains the steep front. To implement the invention, the instant 17 is selected at which pressure subsequent to the disengagement order is determined, prior to the increase in pressure due to the circuit-breaking arc struck between the contacts of the circuit breaker.

In the absence of an internal arc, the fact that the pressure does not increase simultaneously with the disengagement order is due to a mechanical response time specific to moving the moving contact relative to the fixed contact inside the circuit breaker. This initial opening stage comes to an end when the contacts actually separate, and it precedes a second stage during which a circuit-breaking arc is struck between the two contacts.

In the example of FIG. 2, the response time of the circuit breaker under test was about 20 milliseconds (ms). To implement the method in an electrical substation including such a circuit breaker, an instant 17 is selected for determining the pressure after the disengagement order 15, which instant is offset from the order by 20 ms.

The short-circuit current breaking test thus makes it possible using the pressure curve as corroborated by the current curve to set the instant at which pressure is determined after the disengagement order in each circuit breaker or each type of circuit breaker having the same mechanism for displacing the moving contact relative to the fixed contact.

The protection system of the electrical substation possesses its own response time which is a function of its electronics, and which is usually about 10 ms. For each circuit breaker it is advantageous to store in the memory of the acquisition and processing unit the pressure as determined prior to the disengagement order by a length of time not less than the response time of the protection system. In this manner, it is certain that the determined pressure represents the reference pressure of the circuit breaker prior to the appearance of any internal arc.

In FIG. 2, the instant 11 at which the pressure is determined prior to the disengagement order can be set at −100 ms, for example. The memory of the acquisition and processing unit contains a stack of chronologically-indexed instantaneous pressures over a duration of 100 ms. On receiving the signal 19 simultaneously with the disengagement order, the acquisition unit extracts from the memory stack the first-stored instantaneous pressure, i.e. the pressure stored at −100 ms, so as to be able to compare it with the pressure as determined after the disengagement order.

In FIG. 2, the pressure determined at instant −100 ms is equal to the pressure as determined at instant +20 ms relative to the disengagement order 15. During real operation of the substation, the method makes it possible to conclude that the internal arc that gave rise to the protection system issuing a disengagement order did not take place in the circuit breaker for which these pressures are equal.

In FIG. 3, the pressure determined at instant −100 ms is lower than the pressure determined at instant +20 ms relative to the disengagement order 15. During real operation of the substation, the method makes it possible to conclude that the internal arc that caused the protection system to issue the disengagement order took place in the circuit breaker which presents these unequal pressures.

Advantageously, provision is made to set the instant at which pressure is determined after the disengagement order by means of a routine test, which is simpler to implement than a circuit-breaking test, even though a circuit-breaking test is the only test capable of showing that there is no variation in pressure between the disengagement order and actual separation of the circuit breaker contacts.

During the routine test, the instant of actual separation between the contacts subsequent to the disengagement order is obtained using a curve of electrical continuity measurements between the contacts 1 and 3 of the circuit breaker, which is acquired and displayed, for example, by means of an oscilloscope having two channels, one connected to the contacts 1 and 3 in series, and the other to the disengagement order 15. The test is performed under no load so there is no internal arc and no circuit-breaking arc. It serves mainly to determine the mechanical response time of the circuit breaker under test, by determining the moment at which contact separation is recorded.

To implement the method in an electrical substation including a circuit breaker that has been tested by a routine test, the instant at which pressure is determined after the disengagement order is set to be before the appearance of the electrical disturbance that corresponds to actual separation of the contacts.

Preferably, the pressure sensor mounted on each circuit breaker enclosure possesses a response time that is much shorter than the mechanical response time of the circuit breaker or the electronic response time of the protection system. A response time of a few milliseconds is acceptable for implementing the method.

Also preferably, the pressure sensor possesses resolution of the order of a few parts in ten thousand, typically 0.05%. With such a sensor, the method of the invention identifies an internal arc presenting a relative difference between the after and before pressures of 0.5% with relative uncertainty of 10%. Such resolution makes it possible to discriminate between weak internal arcs and a circuit-breaking arc. It is advantageous to use a density sensor, of the type comprising a pressure and temperature sensor with temperature compensation so as to deliver a density signal to the monitoring and control unit U. This type of sensor has a response that is identical to a pressure sensor in the seconds following the appearance of the internal arc or the circuit-breaking arc since there has not been enough time for any heat exchange to take place with the sensor.

Provision is made to process the instantaneous pressures on the basis of a time interval which is preferably equal to the mechanical response time of the circuit breaker. In FIGS. 2 and 3, the pressure curve is reconstituted from an instantaneous pressure signal which is filtered by frequency conversion and sampled every 20 ms. This eliminates any disturbance at 50 Hz, thereby providing protection against inductive coupling between the circuit breaker current and the signal from the pressure sensor.

Finally, it should be observed that the method of the invention is simple to implement.

Pressure signal acquisition and processing for the purpose of comparing pressures before and after the disengagement order is limited to conventional operations. The method makes use of a pressure sensor which is usually already present on circuit breakers for the purpose of performing other functions, for example monitoring the rate at which the dielectric gas leaks out from the enclosure. The same applies to the protection system. Investment in terms of hardware is therefore small.

What is claimed is:

1. A method of discriminating between an internal arc and a circuit-breaking arc established inside the enclosure of a circuit breaker in a bay of a medium or high voltage metal-clad substation, by means of measurements of the pressure of the dielectric gas inside the enclosure of said circuit breaker, in which the appearance of an internal arc is detected by a protection system which responds by transmitting a disengagement order to the circuit breaker to cause its contacts to separate, said separation causing a circuit-breaking arc to appear, the method comprising the following steps:

continuously measuring the pressure of the dielectric gas inside the enclosure of the circuit breaker;

recording said pressure measurements so that after the instant at which the disengagement order is transmitted, a first pressure value measured before said instant can be recovered; and comparing said first pressure value with a second pressure value measured after said instant to identify that an internal arc is established in said circuit breaker enclosure if the second value is greater than the first value, or that the internal arc is not established in said circuit breaker enclosure if both pressure values are equal.

2. The method of claim 1, in which the second pressure value corresponds to a pressure measured before the contacts of the circuit breaker separate.

3. The method according to claim 1, in which the first pressure value corresponds to a pressure measured before said instant at which the disengagement order is transmitted minus at least the response time of the protection system.

4. The method according to claim 1, in which a density sensor is used to measure the pressure of the dielectric gas inside the enclosure of the circuit breaker.

* * * * *